United States Patent [19]

Hehl

[11] Patent Number: 4,708,631
[45] Date of Patent: Nov. 24, 1987

[54] INJECTION UNIT FOR INJECTION MOLDING MACHINE

[76] Inventor: Karl Hehl, Arthur-Hehl-Strasse 32, 7298 Lossburg 1, Fed. Rep. of Germany

[21] Appl. No.: 814,410

[22] Filed: Dec. 30, 1985

[30] Foreign Application Priority Data

Dec. 28, 1984 [DE] Fed. Rep. of Germany ....... 3447707

[51] Int. Cl.$^4$ .............................................. A23P 1/00
[52] U.S. Cl. .................................... 425/542; 425/574; 425/594
[58] Field of Search ............... 425/542, 559, 560, 561, 425/562, 574, 594

[56] References Cited

U.S. PATENT DOCUMENTS 3,729,280 4/1973 Hehl .................................... 425/574

Primary Examiner—Bernard Nozick
Attorney, Agent, or Firm—Schwartz, Jeffery, Schwaab, Mack, Blumenthal & Evans

[57] ABSTRACT

An injection unit is disclosed with bridges for carrying a plastification cylinder and plastification screw, which bridges are capable of moving along stationary guide rods. The bridges also carry a central injection cylinder and drive cylinders, the drive cylinders being diametrically disposed with respect to the injection cylinder. An antirotation arrangement includes diametrically disposed support bearings to prevent the rotary drive motor as a whole from turning. The surfaces of the plunger pistons of two decompression cylinders serve as such support bearings. The plunger pistons are anchored adjacent one of the bridges, i.e., the bridge which bears the plastification screw. This bridge forms a structural unit with the other bridge. The overall arrangement frees the guide rods to a great extent from the repeating cyclical stress of bending due to resisting rotation of the rotary guide motor as a whole.

10 Claims, 5 Drawing Figures

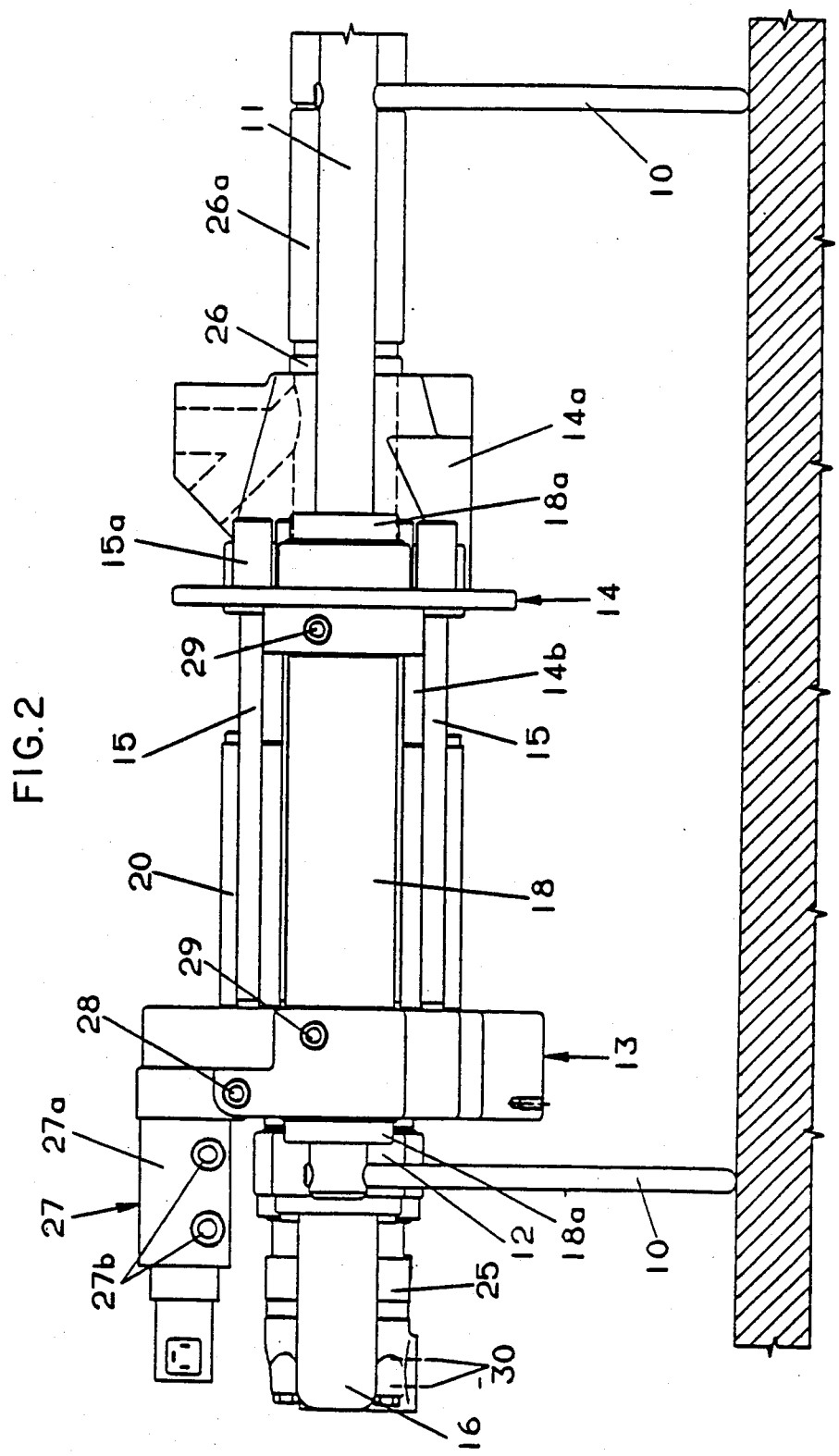

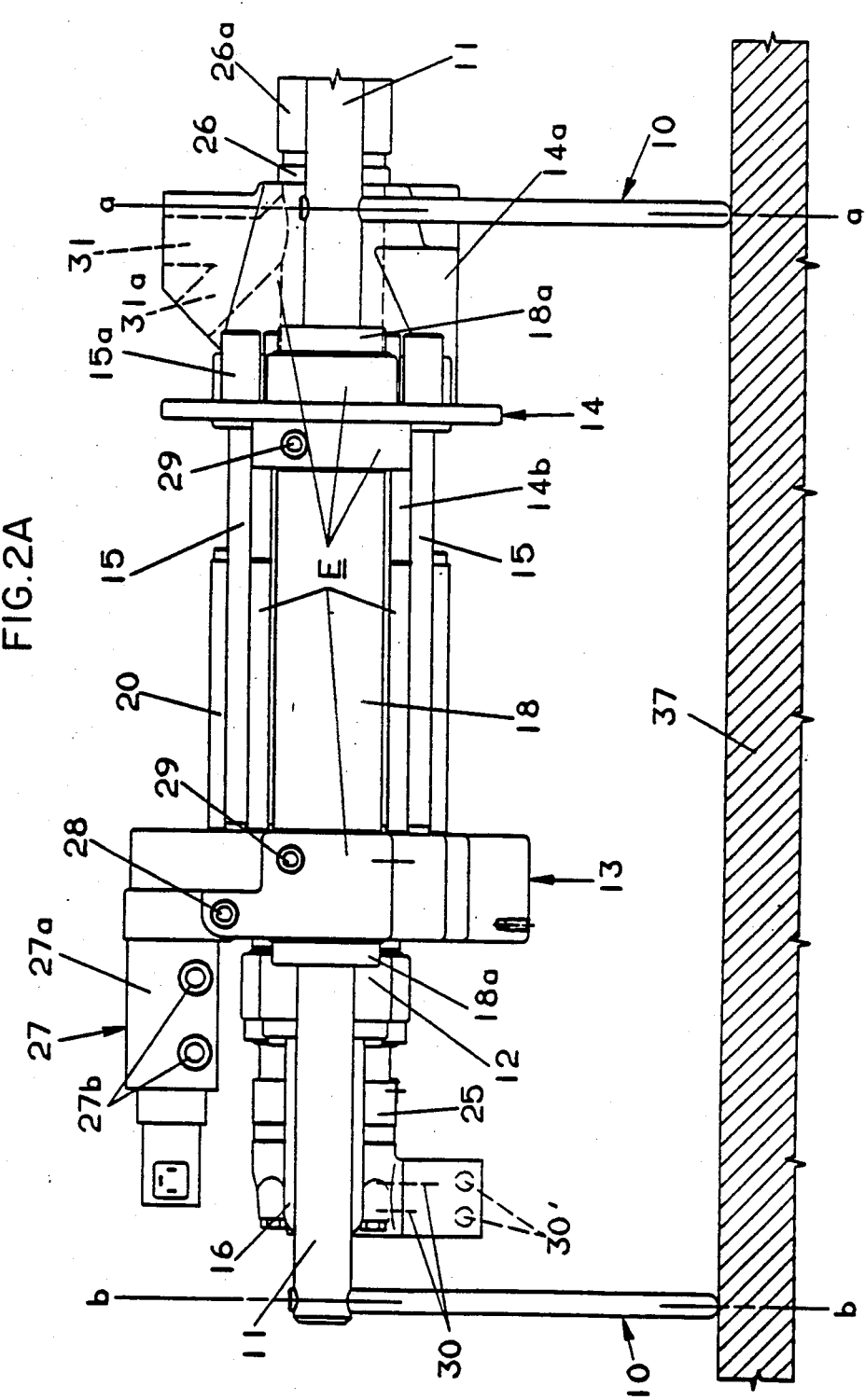

INJECTION UNIT FOR INJECTION MOLDING MACHINE

BACKGROUND OF THE INVENTION

1. Field of the Invention

The invention pertains to an injection unit for an injection molding machine which injects plastic into a mold along an injection axis. The injection unit includes a set of stationary guide rods, and a first bridge extending between the guide rods. A plastification cylinder is carried by the first bridge, this plastification cylinder being for receiving, plastifying and discharging plastic to be molded. A plastification screw is disposed in the plastification cylinder. A hydraulic injection cylinder with an injection piston therein is coupled with the plastification screw for effecting an injection stroke of the plastification screw. There are a set of hydraulic drive cylinders coaxial with the quide rods to drive the injection unit. Each hydraulic drive cylinder includes a drive piston therein, the drive pistons being coupled with the guide rods. A second bridge extends between the guide rods and carries the plastification screw. A rotary drive motor is coupled with the plastification screw for rotatably driving the same.

2. Description of the Prior Art

In a known injection unit of this type (German Offenlegungsschrift No. 20 20 337 and corresponding U.S. Pat. No. 3,729,280), a rotary drive motor is positioned on a distinct bridge which is movable on stationary guide rods to prevent rotation. As a result, the distance between the front and rear guide rod support points must be great enough to enable forward and/or reverse strokes of the drive cylinder and to allow additionally for a decompression stroke while the injection unit is retracted from the injection mold. Under these conditions, repeated, cyclical bending of the guide rods during the injection cycles is unavoidable, because the injection unit is at a relatively great distance from the guide rod support points after retraction from the injection mod. It has been shown that precision guidance deteriorates when such injection units are subjected to intensive use over lengthy periods of time. This has a particularly disadvantageous effect when the nozzle forms part of the confines of the injection mold cavity.

In another known injection unit of the same general type (German Offenlegungsschrift No. 23 02 211), ribs are provided on the cylinders of the drive cylinders as support bearings to prevent rotation. These ribs form tracks for rollers on the rotary drive motor. When the decompression cylinders are activated, the rollers run up the tracks formed by the ribs, which thus receive a considerable load. On the other hand, the guide rods are neither designed not suited to rest on the machine pedestal due to their being made of several sections. Due to the unavoidable bending stress to which the guide rods and drive cylinders are subjected, an injection unit of this type is thus only possible in a smaller-sized embodiment

SUMMARY OF THE INVENTION

An object of this invention is to improve upon an injection unit of this general type in such a way that the guide rods and/or drive cylinders are virtually relieved of repeated, cyclical bending or torque stress caused by preventing rotation of the rotary drive motor, which stresses place repeated, cyclical loads on their support bearings.

This object is attained according to the invention by providing antirotation means for preventing the rotary drive motor from rotating. The antirotation means includes supports disposed in diametrically opposed relationship around the rotary drive motor. These supports are provided by surfaces of plungers which are anchored in decompression cylinders, the decompression cylinders being for retracting the plastification screw to relieve pressure on the plastic material in the plastification cylinder. These plungers are anchored in the second bridge, i.e., the bridge carrying the plastification screw. The second bridge forms a structural unit with the first bridge, i.e., the bridge carrying the plastification cylinder, with the drive cylinders, and with the injection cylinder. The plastification screw, rotary drive motor, injection piston, and decompression cylinder together form a single axially moveable unit.

The rotary drive motor includes a flange and the plungers are anchored to that flange. Each plunger has a threaded section in its front, the threaded section being screwed into the second bridge. The front of the injection unit is that end which is adjacent the mold and the rear is that end which is remote from the mold. The injection unit is for mounting on a maching pedestal.

A first support bracket rests on the machine pedestal and extends into free ends of the guide rods in a direction perpendicular to the injection axis. The plungers associated with the decompression cylinders extend rearwardly beyond the first support bracket when the injection unit is at maximum retraction from the mold. The plungers are in front of the first support bracket when the injection unit is applied to the mold.

A second support bracket also supports the guide rods. The first support bracket lies on a first plane perpendicular to the injection axis, and the second support bracket lies in a second plane parallel to the first plane. Each drive cylinder is capable of moving through a certain drive stroke with respect to its piston. The first and second support brackets are spaced from each other a distance corresponding to twice the length of the drive stroke of the drive cylinder.

The first and second bridges are spaced and supported relative to each other by the injection cylinder and the drive cylinders, and these bridges are further held together by tie rods to form a structural unit which is displaceable on the guide rods via cylinder heads in the drive cylinders. The drive cylinders and injection cylinder include casings, the casings extending between and being vertically centered on the first and second bridges. The casings are of steel and the bridges are of cast iron. The inside diameter of the injection cylinder is approximately four times the inside diameter of the decompression cylinder. As indicated, the decompression cylinder is movable through a decompression stroke to retract the plastification screw. Cylindrical support bearings between each decompression cylinder and its associated plunger are disposed at approximately the first plane, i.e., the plane of the first support bracket, when the overall injection unit is at maximum retraction from the mold and the decompression stroke has not been executed.

In an embodiment of this sort, the support bearings receiving the load from the rotary drive motor's rotational inertia are disposed directly on the structural unit comprised of the bridges that bear the plastification cylinder and the plastification screw, which structural unit is itself movable on the guide rods via the cylinder heads of the drive cylinders. In addition, the guide rods can be made shorter because guide rod sections for the antirotation support bearing are no longer required (i.e., German Offenlegungsschrift No. 20 20 337). For this reason, it is also possible to bring the support points at which the rear support elements support the guide rods on the machine pedestal closer to the front supports, thus reducing the bending stress on the guide rods. Further reduced bending of the guide rods results from weight-reduction measures. These weight reduction measures have already been mentioned. As indicated, the first and second bridges are spaced and supported relative to each other by the injection cylinder and drive cylinder and are held together by tie rods to form a structural unit. As also indicated, the drive cylinders and injection cylinders include casings extending between and being centered upon the bridges. Although the bridges are of cast iron, the casings are of steel.

An exemplary embodiment of the invention is described below with reference to the drawing.

BRIEF DESCRIPTION OF THE DRAWING

FIG. 2 is a side elevation, partly in section, of the injection unit of FIG. 1 at its furthest retraction from the injection mold with the decompression stroke not executed;

FIG. 2a is also a side elevation, partly in section, as is FIG. 2, but FIG. 2a shows the injection unit applied to the injection mold.

DETAILED DESCRIPTION

Figure 4:
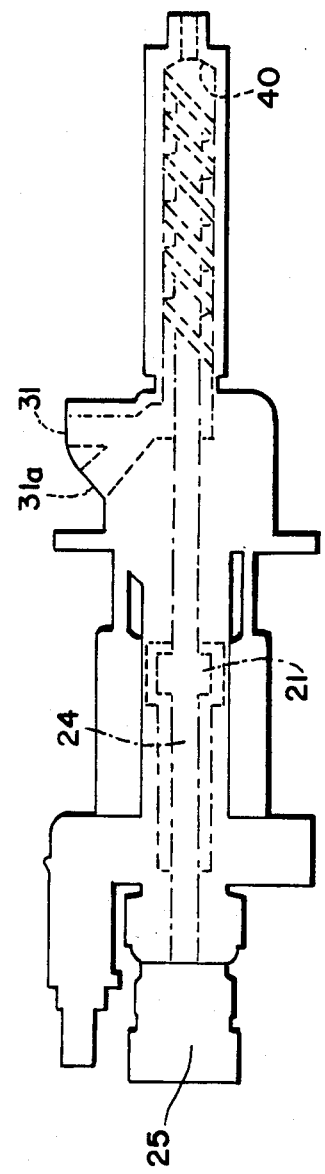
FIG. 4 is a schematic view of the injection unit showing the relationship between the injection piston, spindle and plastification screw and showing the outlet of the plastification cylinder.

The injection unit includes a first bridge 14 which is capable of being moved on guide rods 11. Bridge 14 carries the plastification cylinder 26 equipped with plastification screw 22 and heating collars 26a. The fronts of the guide rods 11 are fastened to the plastic injection molding machine's fixed mold carrier. The plastification cylinder 26 fits into a central hole in a second bridge 14, which bridge is lengthened in the axial direction by an extension 14a that projects forward and is provided with openings 31 and 31a through which the plastic material drops in. The plastic material is injected into a mold (not shown) through an outlet or nozzle 40, schematically shown in FIG. 4. The injection unit furthermore has a hydraulic injection cylinder 20, 21 for the injection stroke of the plastification screw. As previously indicated, and as is well known in the art (see U.S. Pat. No. 3,729,280) the hydraulic injection piston/cylinder arrangement 20, 21 is coupled with the plastification screw 22 to push the screw forward to inject plastic material into the mold. The injection cylinder lies in the injection axis and can be loaded from one side. The cylinder 20 of this injection cylinder is kept centered within matching annular shoulders 14c by tabs 14b located diametrically opposed around the injection axis. These tabs form the boundary of a vertical passage 38 in the bridge 14. At the rear, the cylinder 20 is centered in another bridge 13 on annular shoulders 13a. The rear of the plastification screw 22, which is capable of being rotated and which is capable of axial displacement, rests on this bridge 13. Two hydraulic drive cylinders 18, which drive the injection unit, that is, which move it toward and away from the injection mold, are disposed in diametrically opposed relationship about the injection cylinder 20, 21 and are arranged coaxially with the guide rods 11. The drive pistons 19 are firmly seated on the guide rods 11. The axes of cylinder 18 and cylinder 20 lie in the same horizontal plane. Decompression cylinders 16, 17 are furthermore provided for the reverse stroke of the plastification screw, as is well known in the art (see U.S. Pat. No. 3,729,280.) As already explained, the decompression cylinders are movable through a decompression stroke to retract the plastification screw to relieve pressure on the plastic material in the plastification cylinder. The pressure on the molten plastic material in the plastification cylinder can be relieved by such a reverse stroke, which makes it possible to separate an injection unit having a non-closing nozzle from the injection mold, for the sake of thermal isolation, without the plastic material coming out of the nozzle. The plastification screw 22 forms an axially moving unit with its coaxial rotary drive motor 25, the piston 21 of the injection cylinder 20, 21, and the cylinders 16 of the decompression cylinders 16, 17. Cylinder 20 of the injection cylinder 20, 21 and drive cylinders 18, 19 form a structural unit E with the two bridges 13, 14. This structural unit is mounted on the guide rods 11 in such a way that it is capable of sliding on them via the cylinder heads 18a of the drive cylinders. Two decompression cylinders 16, 17 having plunger pistons 17 are disposed in diametrically opposed fashion around the rotary drive motor 25. The plunger pistons 17 are rigidly connected to structural unit E. The cylinders 16 of the decompression cylinders 16, 17 are rigidly anchored to the flange 12 of the rotary drive motor 25. Each of the plunger pistons 17 is screwed to the adjacent bridge 13 via a threaded portion on their fronts. The rotary drive motor 25 with its pump hose and tank hose connections 30 is connected by means of a coupling 23 to the plastification screw 22 through the spindle 24 which passes through the piston 21 and its piston rod 21a. The injection pressure of the piston 21 is transmitted via an axial thrust bearing 34 to the spindle 24 and from there to the plastification screw 22. The axial thrust bearing abuts a radial flange on the spindle 24. As already explained, and as is well known in the art (see U.S. Pat. No. 3,729,280) the plastification screw forms an axially moving unit with the piston 21 of the injection piston/cylinder arrangement 20, 21, and of course these components are connected together via spindle 24. Thus, movement of piston 21 through its injection stroke imparts movement of screw conveyor 22 through an injection stroke to inject plastic material into the mold.

An antibacklash element 36 prevents undesired rotation of the spindle 24 and plastification screw 22 during the forward stroke. The two bridges 13, 14 are pulled together by tie rods 15 having compression nuts 15a and at the same time are supported and spaced by the cylinders 18, 20. The cylinders 18, 20 are formed of steel casings, the bridges 13, 14 of cast iron. The inside diameter of the cylinder 20 of the injection cylinder 20, 21 is approximately four times the inside diameter of the cylinder 16 of the decompression cylinders 16, 17. The coupling 23 between the spindle 24 and the spiral conveyor 22 is accessible via passage 38. Hydraulic flow controllers 32 and 33 are components of the injection unit's hydraulic control system. Hydraulic flow controller 32 is for advancement and retraction of the injection unit to and from the mold. Hydraulic flow controller 33 is for controlling the plastification screw 22. Of course, hydraulic flow controllers 32, 33 selectively direct hydraulic fluid to and from their associated hydraulic cylinders to effect relative movement between the cylinders and their associated pistons or plungers to operate the injection molding machine. During plastification, the axially movable unit consisting of the rotating plastification screw 22, the spindle 24, the rotary drive motor 25, and cylinders 16 with flange 12 moves back out of the way under the dynamic pressure of the preplastifying material when the nozzle is applied. This sucks oil into the enlarging space within the cylinders of the decompression cylinders 16, 17. The maximum stroke of cylinders 16 necessarily matches the maximum stroke of the piston 21 of the injection cylinder.

The distance between the support points at planes a—a and b—b on the guide rods is roughly twice the length of the drive cylinders 18, 19. U-shaped support brackets 10 are provided as the supporting members, the transverse members of which rests on top of the machine pedestal 37, across the injection axis.

It will be apparent that the foregoing description provides an antirotation arrangement to prevent the rotary motor 25 from rotating as a whole, which arrangement includes support bearings which are disposed in diametrically opposed relationship around rotary drive motor 25. In particular, the surfaces of the plunger piston 17 of the decompression cylinders 16, 17 serve as the antirotation support bearings, which plunger pistons are anchored and bridge 13, the rear of which bridge supports the plastification screw 22.

Figure 1:
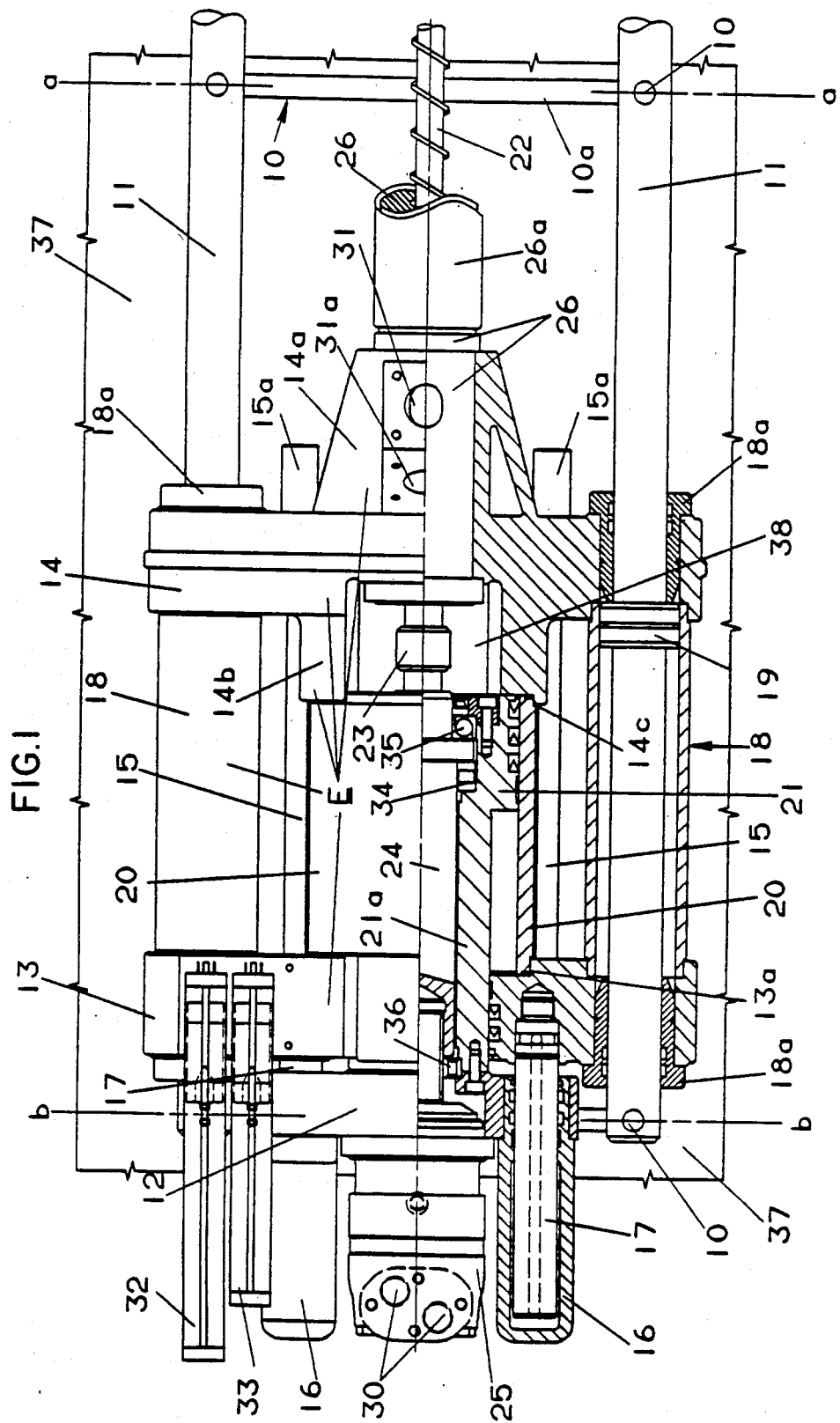
FIG. 1 is a plan view, partially in section, of an injection unit according to the present invention, which injection unit sits on a machine pedestal.
Figure 3:
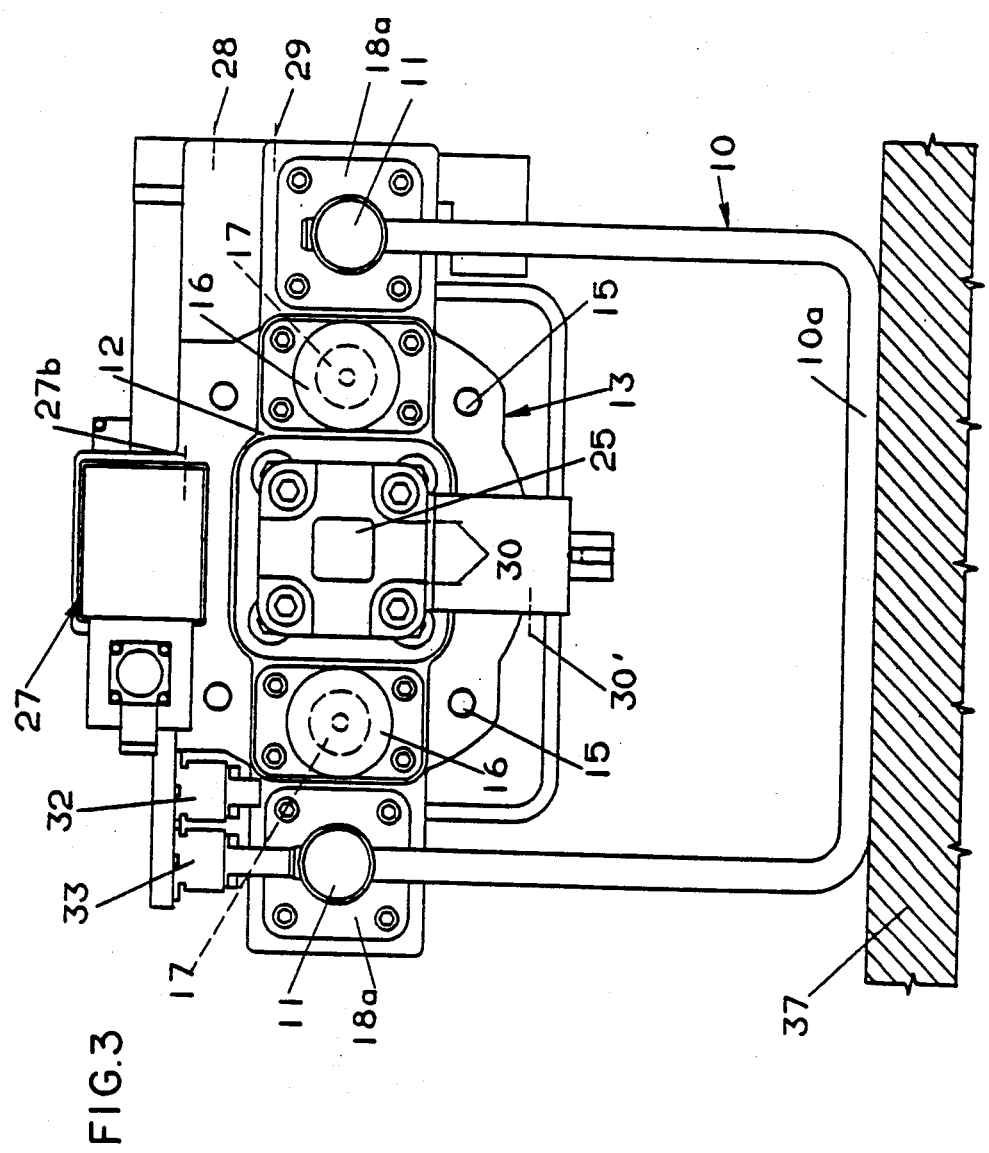
FIG. 3 is a rear elevation of the injection unit of FIG. 1.

As already indicated, a support bracket 10 rests on machine pedestal 37. Support bracket 10 fits into the free ends of guide rods 11 at plane b—b and extend perpendicular to the injection axis. Plane b—b is also perpendicular to the injection axis. Plunger piston 17 extends rearwardly beyond the support bracket 10 when the injection unit is at maximum retraction from the injection mold (FIGS. 1, 2) and is in front of the support bracket 10 when the injection unit is applied to the injection mold (FIG. 2a).

Guide rods 11 are also supported by a further support bracket 10' which lies in a second plane a—a parallel to the first plane b—b of support bracket 10. When the injection unit is at maximum retraction from the injection mold and the decompression stroke is not executed, the cylindrical support bearings on plunger piston 17 lie in approximately the same first plane b—b as that in which the support bracket 10 attaches to the ends of the guide rods 11.

What is claimed is:

1. An injection unit for an injection molding machine which injects plastic into a mold along an injection axis, the injection unit comprising:
   (a) a set of stationary guide rods;
   (b) a first bridge extending between said guide rods;
   (c) a plastification cylinder carried by said first bridge and having an inlet and an outlet, said plastification cylinder being for receiving via said inlet, plastifying and discharging via said outlet plastic to be molded;
   (d) a plastification screw in said plastification cylinder;
   (e) a hydraulic injection cylinder with an injection piston thereon coupled with said plastification screw for effecting an injection stroke of said plastification screw;
   (f) a set of hydraulic drive cylinders coaxial with said quide rods, each said hydraulic drive cylinder including a drive piston therein, said drive pistons of said set of hydraulic drive cylinders being firmly sealed on said guide rods;
   (g) a second bridge extending between said guide rods and at least partially carrying said plastification screw, said second bridge forming a structural unit with said first bridge, with said drive cylinders and with said injection cylinder, said structural unit being movable along said guide rods by said hydraulic drive cylinders;
   (h) a hydraulic decompression cylinder coupled with said plastification screw, said decompression cylinder including a plunger therein for effecting a reverse stroke of said plastification screw to relieve pressure on plastic in the plastification cylinder, said plunger being defined by a surface, said decompression cylinder being movable with said plastification screw relative to said plunger;
   (i) a rotary drive motor coupled with said plastification screw for rotatably driving said plastification screw, said plastification screw, rotary motor, injection piston and movable decompression cylinder forming an axially movable unit; and
   (j) antirotation means for preventing said rotary drive motor from rotating, said antirotation means including supports disposed in diametrically opposed relationship around the rotary drive motor, said supports being provided by said surface of said plunger in said decompression cylinder, said plunger being anchored in said second bridge.

2. The invention as claimed in claim 1, including the rods extending between said first and second bridges and wherein each said drive cylinder includes a cylinder head, said first and second bridges being spaced and supported relative to each other by said injection cylinder and said drive cylinders and held together by said tie rods to form a structural unit which is displaceable in said guide rods via said cylinder heads.

3. The invention as claimed in claim 1, wherein said drive cylinders and said injection cylinder include casings forming said drive and injection cylinders, said casings extending between and being centered on said bridges.

4. The invention as claimed in claim 1, wherein said casings are of steel and said bridges are of cast iron.

5. The invention as claimed in claim 1, wherein said injection cylinder and decompression cylinder each has an inside diameter, the inside diameter of said injection cylinder being approximately four times the inside diameter of said decompression cylinder.

6. The invention as claimed in claim 1, wherein said rotary drive motor includes a flange and wherein said plunger is anchored to said flange.

7. The invention as claimed in claim 1 or 6, wherein said plunger has a threaded section at its front, said threaded section being screwed into said second bridge.

8. The invention as claimed in claim 1, wherein the injection unit has a front and rear, the front being adjacent the mold, the rear being remote from the mold, the injection unit being for mounting on a machine pedestal, wherein said guide rods have free ends, and wherein a first support bracket for resting on the machine pedestal extends into said free ends of said guide rods in a direction perpendicular to the injection axis, said plunger extending rearwardly beyond said first support bracket when the injection unit is at maximum retraction from the mold, the plunger being in front of said first support bracket when the injection unit is applied to the injection mold.

9. The invention as claimed in claim 8, including a second support bracket supporting said guide rods, said first support bracket lying in a first plane perpendicular to the injection axis, said second support bracket lying in a second plane parallel to said first plane, each drive cylinder being capable of moving through a certain drive stroke with respect to its drive piston, said first and second support brackets being spaced from each other a distance corresponding to twice the length of the drive stroke of the drive cylinder.

10. The invention as claimed in claim 8, including cylindrical support bearings between said decompression cylinder and its associated plunger, said decompression cylinder being movable through a decompression stroke to retract said plastification screw, said cylindrical support bearing being disposed in approximately said first plane when the overall injection unit is at maximum retraction from the mold and the decompression stroke has not been executed.

* * * * *